(12) United States Patent
Goldblatt

(10) Patent No.: US 6,505,931 B2
(45) Date of Patent: Jan. 14, 2003

(54) EYE GLASSES WITH ALIGNMENT MARKINGS

(76) Inventor: Larry Goldblatt, 105 Wilson Street West, Unit 16, Ancaster, Ontario (CA), L9G 1N4

( * ) Notice: Subject to any disclaimer, the term of this patent is extended or adjusted under 35 U.S.C. 154(b) by 0 days.

(21) Appl. No.: 10/068,932

(22) Filed: Feb. 11, 2002

(65) Prior Publication Data

US 2002/0122151 A1 Sep. 5, 2002

Related U.S. Application Data

(60) Provisional application No. 60/270,178, filed on Feb. 22, 2001.

(51) Int. Cl.[7] .................................................. G02C 7/16
(52) U.S. Cl. .......................................... 351/46; 351/45
(58) Field of Search .............................. 351/44, 45, 46

(56) References Cited

U.S. PATENT DOCUMENTS

| | | | | |
|---|---|---|---|---|
| 4,531,743 A | * | 7/1985 | Lott | 351/45 |
| 4,991,849 A | * | 2/1991 | Fabanich | 351/45 |
| 5,444,501 A | * | 8/1995 | Aloi et al. | 351/44 |
| 5,489,953 A | * | 2/1996 | Griffith | 351/45 |

* cited by examiner

*Primary Examiner*—Huy Mai
(74) *Attorney, Agent, or Firm*—Robert F. Delbridge

(57) ABSTRACT

Eye glasses which enable a wearer to hit a ball along the ground in a predetermined target line, said eye glasses including a frame attachable to the wearer's head and a pair of shaded lenses carried thereby, said pair of lenses comprising a lens for the wearer's left eye and a lens for the wearer's right eye, and one of the lenses having a horizontal unshaded transparent line extending laterally thereacross, and the other lenses having an unshaded transparent pinhole aligned with said transparent line on said one lens.

5 Claims, 1 Drawing Sheet

EYE GLASSES WITH ALIGNMENT MARKINGS

RELATED APPLICATION

This application claims priority from U.S. Provisional Patent Application No. 60/270,178 filed Feb. 22, 2001.

FIELD OF INVENTION

This invention relates to eye glasses intended for use as an aid in sports such as golf.

BACKGROUND OF INVENTION

Various attempts have been made to provide eye glasses with marking on their lenses to assist a wearer to hit a ball along the ground in an intended target line, such as is required for example in putting. Some of these prior attempts are described in U.S. Pat. No. 5,489,953 (Griffith) issued Feb. 6, 1996; U.S. Pat. No. 4,991,849 (Fabanich) issued Feb. 12, 1991; U.S. Pat. No. 3,871,104 (Underhill, II) issued Mar. 18, 1975 and U.S. Pat. No. 3,264,002 (Palumbo) issued Aug. 2, 1966. However, for one reason or another, such prior proposals have not been particularly successful in practice.

It is therefore an object of the present invention to provide improved eye glasses of this kind.

SUMMARY OF INVENTION

According to the present invention, eye glasses which enable a wearer to hit a ball along the ground in a predetermined target line include a frame attachable to the wearer's head and a pair of shaded lenses carried thereby, said pair of lenses comprising a lens for the wearer's left eye and a lens for the wearer's right eye, and one of the lenses having a horizontal unshaded transparent line extending laterally thereacross, and the other lenses having an unshaded transparent pinhole aligned with said transparent line on said one lens.

In use, the wearer looks down at the ball on the ground, and positions his or her head such that the transparent line is aligned with a target, the pinhole is seen in the transparent line, and the ball is seen in the pinhole and in the transparent line. The wearer then strikes the ball with a striker, which may be a putter, by moving the striker along the line defined by the transparent line.

The pair of shaded lenses may be provided by a sheet of plastic material, and the whole of the sheet of plastic material may be shaded. The slit may be about 0.01" wide and the pinhole may have a diameter of about 0.25".

BRIEF DESCRIPTION OF THE DRAWINGS

Embodiments of the invention will now be described, by way of example, with reference to the accompanying drawings, of which.

DESCRIPTION OF PREFERRED EMBODIMENTS

Figure 1:
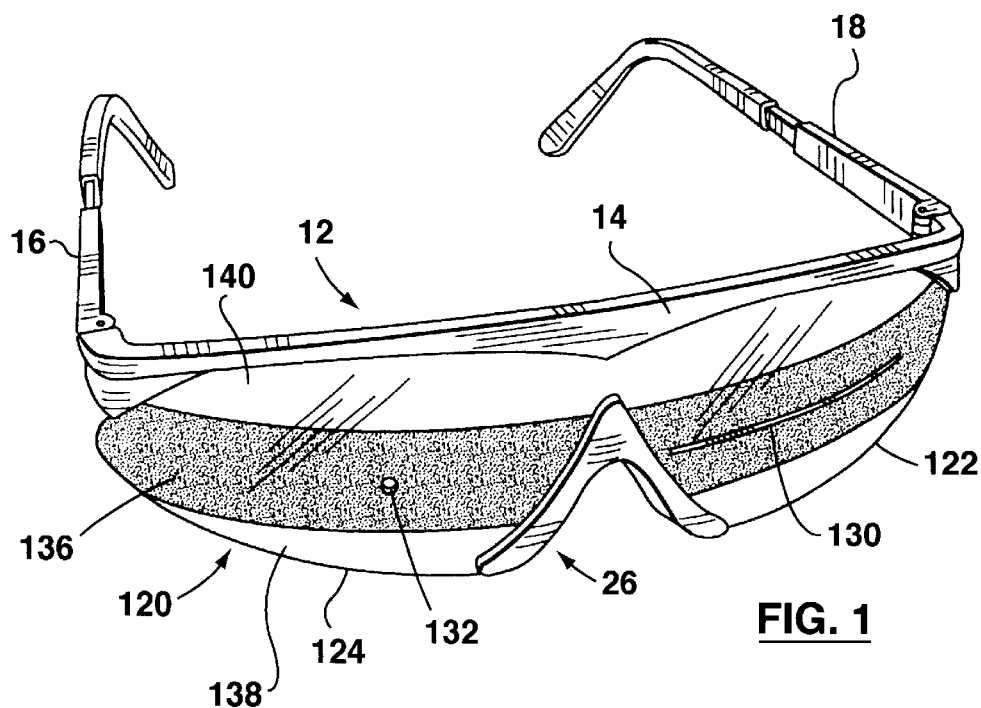
FIG. 1 is a perspective view of eye glasses in accordance with one embodiment of the invention.

Referring first to FIG. 1 of the accompanying drawings, eye glasses have a conventional frame 12 with a transverse member 14 and ear pieces 16, 18 hinged to opposite ends thereof. A shaped sheet of shaded semi-transparent plastic material 20 secured to the transverse member 14 so as to provide a left hand lens 22 and a right hand lens 24. A conventional central nose piece 26 is also provided.

In accordance with this embodiment of the invention, the left hand lens 22 has a horizontal slit 30 extending horizontally thereacross, and the right hand lens 24 has a pinhole 32 which is in line with the slit 30.

The eye glasses shown in FIG. 1 are for a left handed golfer. In use for putting, the wearer looks down on the ball, and positions his or her head such that the slit 30 is aligned with the target, the pinhole 32 is seen in the transverse line 30, and the ball is seen in the pinhole 32 and in the transverse line 30. The wearer then strikes the ball with a putter by moving the putter along the line defined by the slit 30.

For a right handed golfer, the slit 30 would be provided in the right hand lens 24 and the pinhole 32 would be provided in the left hand lens 22. In other words, the pinhole 32 is provided in the lens which is nearest the target.

The width of the slit 30 and the size of the pinhole 32 should be sufficiently large so that the wearer can adequately see therethrough, but on the other hand should be sufficiently small to provide satisfactory accuracy. A suitable width for the slit 30 is about 0.012" (0.3 mm) and a suitable diameter for the pinhole 32 is about 0.25" (6mm), i.e. about 20 times the width of the slit 30.

Figure 2:
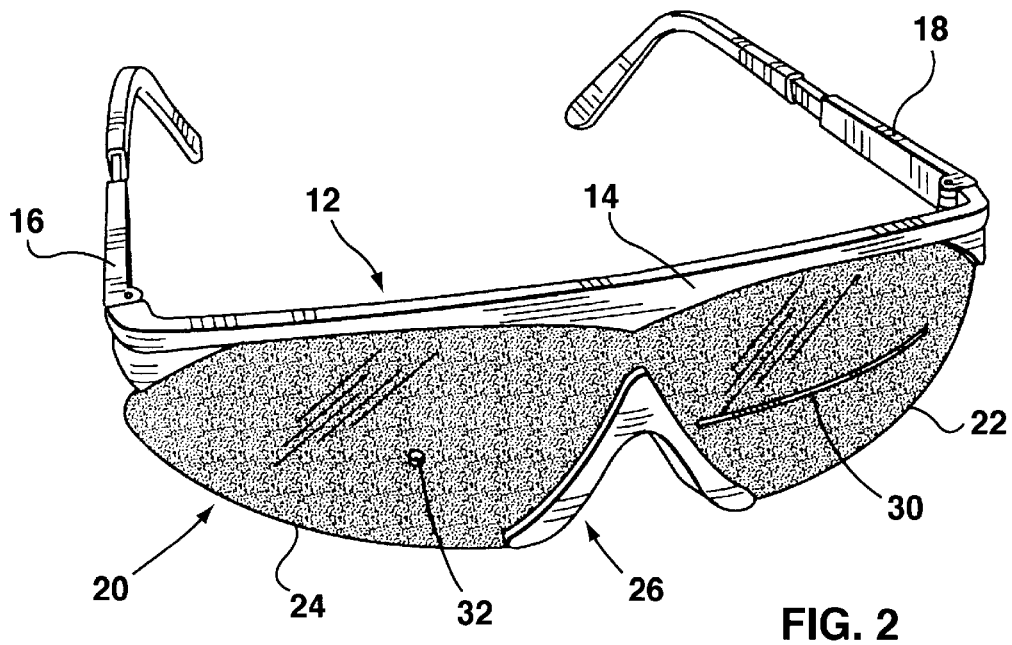
FIG. 2 is a similar view of eye glasses in accordance with another embodiment.

Although preferable, it is not essential that the whole of the shaped sheet of plastic material 20 be shaded. For example, as in a second embodiment of the invention shown in FIG. 2, the shaped sheet of plastic material 120 has a shaded portion 136 in the form of a horizontally extending opaque band in which the slit 130 and the pinhole 132 are located, with portions 138, 140 of the sheet material 120 above and below the shaded band 136 being unshaded.

Other embodiments of the invention will now be readily apparent to a person skilled in the art from the foregoing description, the scope of the invention being defined in the appended claims.

What is claimed is:

1. Eye glasses which enable a wearer to hit a ball along the ground in a predetermined target line, said eye glasses including a frame attachable to the wearer's head and a pair of shaded lenses carried thereby, said pair of lenses comprising a lens for the wearer's left eye and a lens for the wearer's right eye, and one of the lenses having a horizontal unshaded transparent slit extending laterally thereacross, and the other lenses having an unshaded transparent pinhole aligned with said transparent slit on said one lens.

2. Eye glasses according to claim 1 wherein said pair of shaded lenses is provided by a sheet of plastic material.

3. Eye glasses according to claim 2 wherein the whole of said sheet of plastic material is shaded.

4. Eye glasses according to claim 1 wherein the slit is about 0.01" wide and the pinhole has a diameter of about 0.25".

5. Eye glasses according to claim 1 wherein said pair of shaded lenses is provided by a sheet of plastic material, the whole of said sheet of plastic material is shaded, the slit is about 0.01" wide and the pinhole has a diameter of about 0.25".

* * * * *